Patented June 5, 1951

2,555,825

UNITED STATES PATENT OFFICE 2,555,825

CONCENTRATION OF IRON ORES

William L. Sullivan, New Port Richey, Fla., assignor to Minerals Separation North American Corporation, New York, N. Y., a corporation of Maryland No Drawing. Application January 29, 1948, Serial No. 5,199

1 Claim. (Cl. 209—166)

This invention relates to the concentration of iron ores and particularly to the concentration of finely-divided ores in which the iron occurs as one or more of its several oxides or as the carbonate, and in which the gangue is principally silica or quartz.

The method which is the present invention may be considered as in the nature of an improvement on the methods of concentrating oxidized iron ores by froth-flotation of the siliceous gangue by the use of various anionic collectors in conjunction with lime and aqueous solutions of starch gelatinized by any one of several methods. In the practicing of such methods, various collectors, such as red oil, tall oil, or the soaps thereof, have been used; and the starch may be gelatinized by boiling it in water, or by boiling it in water with acids, alkalies or oxidizing agents for periods of about a minute, or by somewhat longer contact of the starch at room temperature with water and certain of these acids, alkalies or oxidizing agents. Regardless of the collector used, or the method of gelatinizing the starch, it has always been the practice, as far as I have been able to ascertain, to condition the ore with reagents in thin pulp, that is, in a pulp containing about 10% to 20% solids.

Certain marked difficulties have been observed in the methods of concentration as described above. The methods are very sensitive to the effect of the starch. The amount of starch must be very carefully adjusted, not only to the varying proportions of the different iron minerals, but also to the amount of slimes contained in the ore. In the operation of large iron ore washing plants, such as are found on the Mesabi Range, the washer rejects or tailings are subject to rapid and frequent change. Since such washer rejects are a principal source of the above described iron ores which are subjected to the above-mentioned methods, and since the only method for determining the optimum amount of starch is one of trial and error, the satisfactory operation of the process has been difficult in some cases. Since the range of concentrations of starch over which acceptable or salable iron concentrates can be obtained is a narrow one, it follows that with the present methods described above there will frequently be periods in which it is difficult to produce concentrates that are satisfactory with respect to either iron content or silica content or both.

A further difficulty experienced in practicing the method described above arises from the fact that it operates best when the pulp temperatures are about 20° C. or above. When the temperature of the flotation pulp falls much below 20° C., it has been found that flotation of the silica or quartz decreases; and at pulp temperatures of 10° C. or below, it becomes very difficult with some ores to remove enough silica to make an economic iron concentrate. This is a problem of major importance, since such temperatures are commonly met with in the Lake Superior region, even during the season when the weather is mild enough to permit mining and shipping operations.

It is the object of the present invention to overcome the above-mentioned difficulties in the present methods as above described.

The present invention results from the discovery that certain novel and very beneficial effects result when the pulp is conditioned with the gelatinized starch solution, and with the lime solution and the anionic collector in the manner described below. In concentrating finely-divided iron ores containing gangue consisting principally of silica or quartz, by the above-mentioned methods (in which the ore is mixed in aqueous pulp with an anionic collecting agent such as fatty or resin acids or a mixture thereof or the soaps thereof, along with cooperating agents consisting of an aqueous suspension of lime and an aqueous solution of gelatinized starch, and then subjected to froth flotation) I have found that remarkable and unexpected benefits result if the solution of gelatinized starch is added first (that is, before the other reagents) to a thick aqueous suspension of the ore, that is, one containing about 50–65% solids by weight; after which the pulp is thinned to about 10% to 20% solids and the lime suspension and anionic collector are added. The range of effective starch concentrations is then very greatly increased, with a consequently lowered sensitivity, and higher-grade iron concentrates with a higher recovery of the total iron values are possible. In addition, when the gelatinized starch solution is so added, the separation of the siliceous gangue from the iron is substantially as complete at pulp temperatures between 20° C. and 0° C., as it is at pulp temperatures above 20° C.

While the various starch preparations are not equally effective in the practice of my invention, I have found that better results are obtained with all of them when my improved method is used. Starches gelatinized in water by grinding, heat alone or with acids, with acidic compounds or with caustic, are effectively used in my method. Good results have been obtained by the use of a gelatinized starch solution resulting from starch which has been suspended in water along with enough acid to give the resultant suspension a pH of about 3 or below, followed by boiling for about one minute and subsequently neutralizing the gelatinized starch solution with caustic soda. Excellent results have also been obtained by the use of a gelatinized starch solution resulting from starch which has been suspended in water along with caustic soda, followed by boiling for about one minute. While I prefer to use a sodium soap of crude talloel because of its cheapness in the practice of my invention, any of the common anionic collectors are effective.

The following tests and examples will amplify the above description and will make clear the advantages to be gained by the use of the invention. While the examples are intended to be illustrative of my invention as I choose to practice it, I do not wish the scope of said invention to be limited in any way by them.

First series of tests

In the series of tests below reported, the advantages of first conditioning with a gelatinized starch solution in a thick pulp are apparent. The feed was washer classifier overflow containing about 18.5% Fe, from which about four per centum (4%) which was plus 65 mesh was screened out and ground through 65 mesh and added to the minus 65 mesh portion, thus producing a feed which was all minus 65 mesh.

In the tests reported in part A of the table below, a thick aqueous pulp of the above feed containing about 65% solids by weight was first conditioned with an aqueous suspension of gelatinized starch for about 2½ minutes. The pulp was then diluted with tap water to make a thin pulp containing about 10% solids, which was followed by the addition of an aqueous suspension of lime and the anionic collector, with about one minute's agitation following the addition of each. The conditioned pulp was then subjected to froth-flotation treatment and a silica-bearing froth removed. The residue in the flotation cell was the iron-bearing concentrate.

In the tests reported in part B of the table below, a thin aqueous pulp of the same ore described above was made with a density of only about 10% solids. The starch solution, the lime suspension and the anionic collector were added to this thin pulp, with about one minute's agitation after the addition of each. The conditioned pulp was then subjected to froth-flotation treatment as before, a silica-bearing froth being removed, the iron concentrate being the residue in the flotation cell.

All of the tests reported in part A and part B of this First series of tests were run with a pulp temperature of about 25° C. In all of the tests in this series the same quantities of lime and anionic collector were used. The quantity of starch in the gelatinized starch solution used is noted in the table. The starch used in these tests was made up as a 2½% aqueous suspension of starch and H$_2$SO$_4$ in the ratio of 97 parts of starch to 3 parts of H$_2$SO$_4$ by weight. This suspension was boiled for about one minute, resulting in a gelatinized starch solution. The lime was used as an aqueous suspension; and the anionic collector was the sodium soap of crude talloel and was employed as a 2½% aqueous solution. 5.5 lbs. per ton of lime and 1.6 lbs. per ton of anionic collector were used in each test, expressed in pounds per ton (2000 lbs.) of feed. The tests are reported below.

| Gelatinized Starch Lbs./Per Ton | Silica Froth | | Iron Concentrate | | |
|---|---|---|---|---|---|
| | Per Cent Weight of Feed | Per Cent Fe | Per Cent Weight of Feed | Per Cent Fe | Per Cent Rec. of Fe |
| PART A.—CONDITIONED WITH STARCH IN A THICK PULP | | | | | |
| 2.50 | 87.7 | 14.2 | 12.3 | 46.6 | 31.5 |
| 2.75 | 86.7 | 13.6 | 13.3 | 47.6 | 34.9 |
| 3.00 | 85.6 | 13.0 | 14.4 | 50.0 | 39.3 |
| 3.25 | 83.3 | 11.6 | 16.7 | 52.8 | 47.7 |
| 3.50 | 82.4 | 11.0 | 17.6 | 52.8 | 50.6 |
| 3.75 | 78.3 | 8.2 | 21.7 | 53.4 | 64.4 |
| 4.00 | 78.3 | 8.4 | 21.7 | 54.4 | 64.2 |
| 4.25 | 76.7 | 7.6 | 23.3 | 54.2 | 68.4 |
| PART B.—CONDITIONED WITH STARCH IN A THIN PULP | | | | | |
| 2.50 | 83.9 | 12.4 | 16.1 | 46.8 | 42.0 |
| 2.75 | 82.0 | 11.8 | 18.0 | 47.4 | 46.8 |
| 3.00 | 81.3 | 11.0 | 18.7 | 49.8 | 51.0 |
| 3.25 | 78.9 | 9.6 | 21.1 | 50.4 | 58.4 |
| 3.50 | 76.2 | 8.6 | 23.8 | 49.8 | 64.4 |
| 3.75 | 71.2 | 6.8 | 28.8 | 47.4 | 73.8 |
| 4.00 | 70.9 | 6.8 | 29.1 | 46.4 | 73.7 |
| 4.25 | 66.0 | 6.6 | 34.0 | 41.2 | 76.3 |

It will be obvious, from a comparison of the tests in part A with the tests in part B, that as the quantity of gelatinized starch was increased far better results were obtained in the tests in part A in which conditioning with gelatinized starch was carried out in a thick pulp, than in part B in which conditioning with gelatinized starch was carried out in a thin pulp.

Second series of tests

The tests reported below show the advantages of conditioning with gelatinized starch solution in a thick rather than in a thin pulp, when widely varying temperatures of the pulp are encountered. The feed for the following series of tests was the same as was described at the beginning of the description of the First series of tests. It was prepared in the same way to give a minus 65 mesh feed. The general procedure for the tests in this Second series of tests is as described above for the First series of tests. Pulp temperatures are as stated below. The tests at 28° C. were run at room temperature, while in the tests at 8° C., the pulp was suitably cooled by ice in such a way as to in no wise depart from the procedure at room temperature, except in respect to temperature of the pulp. It will be understood that the 8° C. is approximate, since while the temperature of the pulp did fall a few degrees below this figure at times, in no case did it rise above 8° C. during the testing period.

The starch used in this Second series of tests was made up as a 2½% aqueous suspension of starch and H$_2$SO$_4$ in the ratio of 97 parts of starch to 3 parts of H$_2$SO$_4$ by weight. This suspension was boiled about one minute and, then by means of caustic soda was made neutral to phenolphthalin, thereby producing a gelatinized starch solution which is hereafter referred to as "starch-acid neutralized." Exactly the same quantities of lime and anionic collector are used in all the tests in this Second series of tests. It will be noted that the amount of starch used was gradually increased in the two methods exemplified by the tests reported in part A and part B of the First series of tests; and a glance at the data about those tests will show that the starch requirements of the two methods differ somewhat. In choosing the starch poundages for the Second series of tests reported below, this difference was recognized in order to display each method in the best light. 5.5 pounds of lime and 1.4 pounds of anionic collector were used in all four of the tests below reported. As before, the lime was used as an aqueous suspension, and the anionic collector was the sodium salt of crude talloel. Starch-acid neutralized, was used in the amounts indicated below. Reagent quantities are again expressed in pounds per ton (2000 lbs.) of feed.

| Starch-Acid Neutralized Lbs. Per Ton | Pulp Temperature | Silica Froth | | Iron Concentrate | | |
|---|---|---|---|---|---|---|
| | | Per Cent Weight of Feed | Per Cent Fe | Per Cent Weight of Feed | Per Cent Fe | Per Cent Fe Rec. |
| PART A.—CONDITIONED WITH STARCH IN A THICK PULP | | | | | | |
| | °C. | | | | | |
| 4.25 | 28 | 80.7 | 9.2 | 19.3 | 58.8 | 60.5 |
| 4.25 | 8 | 81.8 | 10.2 | 18.2 | 56.8 | 55.4 |
| PART B.—CONDITIONED WITH STARCH IN A THIN PULP | | | | | | |
| 3.25 | 28 | 78.2 | 8.6 | 21.8 | 56.8 | 64.8 |
| 3.25 | 8 | 76.1 | 9.4 | 23.9 | 48.4 | 61.8 |

It will be noted that in part A the grade (per cent Fe) in the test run with pulp at 8° C. was only slightly less than in the test run with pulp at 28° C.; while in part B the grade of the concentrate obtained in the test at 8° C. was much lower than in the test run at 28° C. In the tests at 8° C., the test with the gelatinized starch solution added to a thick pulp yielded a commercially useful concentrate, while the test with the starch solution added to a thin pulp did not. It will be recognized, of course, that in these tests and in the First series of tests, increased recoveries could have been obtained by re-treatment of the silica froth-product in the usual manner.

The excellent results, which are obtainable by the use of the method which is the present invention, will be obvious from the tests in the following examples, in all of which tests three quartz froth-floats were successively removed and discarded, leaving the machine discharge as the iron concentrate. In all of these tests, the feed was a low-grade, finely-divided oxidized iron ore in which all of the particles were minus 65 mesh.

In Examples 1 and 2, this feed was partially conditioned with starch-acid neutralized (of the kind described above) in a thick ore pulp containing about 65% solids. The time for this conditioning in the tests of Example 1 was 2½ minutes, and was less in Example 2, as will be hereafter pointed out. The ore pulp was then diluted to about 10% solids, and this thin pulp was then successively conditioned with the aqueous suspension of lime and with the anionic collector which are above described, the addition of these reagents being followed in each case by a brief agitation of the thin pulp to which they were added. The thus fully conditioned thin ore pulp was subjected to froth-flotation treatment and the quartz froth was removed; then a small amount of the anionic collector was added to the residue which was again subjected to froth-flotation treatment and a second quartz froth was removed; and then another small amount of the anionic collector was added to the residue which was subjected to another froth-flotation treatment, thereby producing a third quartz froth which was removed. As will be apparent from the data hereafter given, the residue from these froth-flotation treatments was an iron concentrate of high grade, containing a low percentage of insolubles ($SiO_2$); with a recovery of a satisfactory percentage of the iron in the feed.

*Example 1*

In this example, the reagents used in both tests were as follows:

| | Lbs. per Ton in the Flotation Treatments | | |
|---|---|---|---|
| | 1st | 2nd | 3rd |
| Starch-acid neutralized | 5.0 | | |
| Lime | 5.5 | | |
| Anionic Collector | 1.0 | 0.3 | 0.2 |

One test was run with the pulp at room temperature, which was about 28° C.; and in the other, the pulp was maintained at about 8° C. The results of these tests are given below:

| Products | Per Cent Weight | Per Cent Fe | Per Cent $SiO_2$ | Per Cent Recovery |
|---|---|---|---|---|
| WITH THE PULP AT 28° C. | | | | |
| Feed | 100.0 | 23.1 | | 100.0 |
| 1st Froth | 70.9 | 9.0 | | 27.6 |
| 2nd Froth | 3.2 | 43.2 | | 6.0 |
| 3rd Froth | 1.8 | 46.8 | | 3.6 |
| Concentrate | 24.1 | 60.2 | 5.3 | 62.8 |
| Conc. and 2nd and 3rd Froths | 29.1 | 57.5 | | 72.4 |
| WITH THE PULP AT 8° C. | | | | |
| Feed | 100.0 | 23.2 | | 100.0 |
| 1st Froth | 72.1 | 10.6 | | 33.0 |
| 2nd Froth | 5.8 | 41.0 | | 10.3 |
| 3rd Froth | 2.2 | 48.6 | | 4.5 |
| Concentrate | 19.9 | 60.8 | 5.1 | 52.2 |
| Conc. and 2nd and 3rd Froths | 27.9 | 55.7 | | 67.0 |

It will be noted that the results of these tests of the method with the ore pulp at 28° C. and 8° C. were about equally good, although percent recovery when the pulp was at the lower temperature was somewhat lower.

*Example 2*

It will be noted that in the tests described above in Example 1 the thick ore pulp was conditioned for about 2½ minutes with the starch-acid neutralized. The tests reported below demonstrate that even less time than 2½ minutes may be used in said conditioning operation. In these tests the reagents employed were the same in character and amount as in the tests in Example 1, and all methods of treatment were the same as in those tests, except that the time used for conditioning thick ore pulp with starch-acid neutralized was reduced in the respective tests from 2½ minutes to 1 minute, 30 seconds and 15 seconds. The results of these tests are shown in the following tables which, in the first line of each (tests Nos. 1 and 5) contain for purposes of comparison the results of the tests given in Example 1.

| Test No. | Starch Cond. Time | Machine discharge ||||
| | | Per Cent Weight | Per Cent Fe | Per Cent SiO₂ | Per Cent Rec. |
|---|---|---|---|---|---|
| WITH THE PULP AT 28° C. ||||||
| 1 | 2½ Min | 24.1 | 60.2 | 5.3 | 62.8 |
| 2 | 1 Min | 23.3 | 60.0 | 5.3 | 61.5 |
| 3 | 30 Sec | 23.5 | 60.0 | 5.8 | 61.8 |
| 4 | 15 Sec | 24.8 | 58.8 | 7.2 | 61.9 |
| WITH THE PULP AT 8° C. ||||||
| 5 | 2½ Min | 19.9 | 60.8 | 5.1 | 52.2 |
| 6 | 1 Min | 21.2 | 59.2 | 7.1 | 55.1 |
| 7 | 30 Sec | 21.4 | 59.0 | 8.0 | 55.1 |
| 8 | 15 Sec | 22.4 | 56.8 | 9.8 | 54.6 |

From the above tables it will be apparent that the time of conditioning the thick ore pulp with starch-acid neutralized may be very brief, without greatly affecting the results of the concentrating operation employing the method which is the present invention.

Example 3

In this example, the solution of gelatinized starch was prepared by making up a 2½% aqueous suspension of 92.5 parts of starch to 7.5 parts of caustic soda, by weight, which was boiled for about one minute with consequent gelatinization of the starch, to make what is hereinafter aclled "causticized starch." In the present example, as in Examples 1 and 2, the lime was employed as an aqueous suspension, and the collector was a 2½% aqueous solution of the sodium soap of crude talloel. The feed was obtained from another sample of washer classifier overflow containing about 23% Fe, in which the ore particles were all minus 65 mesh. This feed was utilized to make a thick aqueous pulp containing about 65% solids, by weight. The causticized starch solution was added to this thick pulp, which was then agitated for about 2½ minutes. The pulp was then diluted to about 10% solids, by weight, after which the lime suspension and anionic collector were added separately with about one minute's agitation, after the addition of each. The thus conditioned pulp was then subjected to froth-flotation treatment, and a silica-bearing froth was removed. Additional anionic collector was then added to the residue, which was again subjected to froth-flotation treatment and a second silica-bearing froth was removed. Additional anionic collector was added to the residue which was again subjected to froth-flotation treatment, resulting in the removal of a third silica-bearing froth. The residue, after these three froth-flotation treatments, was the iron-bearing concentrate.

The amounts of reagents employed were as follows:

| | Lbs. per Ton in the Flotation Treatments |||
| | 1st | 2nd | 3rd |
|---|---|---|---|
| Causticized Starch | 4.5 | | |
| Lime | 5.5 | | |
| Anionic Collector | 1.0 | 0.3 | 0.2 |

The results of the three froth-flotation treatments were as follows:

| Products | Per Cent Weight | Per Cent Fe | Per Cent Recovery |
|---|---|---|---|
| Feed | 100.0 | 22.8 | 100.0 |
| 1st Froth | 70.9 | 9.6 | 29.8 |
| 2nd Froth | 6.5 | 40.6 | 11.6 |
| 3rd Froth | 2.6 | 50.6 | 5.7 |
| Concentrate | 20.0 | 60.4 | 52.9 |
| Conc. and 2nd and 3rd Froths | 29.1 | 55.7 | 70.2 |

It will be noted that the concentrate was of high grade, 60.4% Fe. The percent recovery was rather low, but it will be understood that a higher percent recovery could have been obtained by re-treatment of the silica-bearing froths so as to salvage therefrom a considerable portion of the iron therein.

As a matter of interest, the test just described was repeated using the same feed, the same quantities of the same reagents and the same methods, except that instead of first conditioning the feed with the causticized starch solution in a thick pulp, the feed was conditioned with all three of the reagents in a thin pulp containing only about 10% solids, by weight. The results of this test were as follows:

| Products | Per Cent Weight | Per Cent Fe | Per Cent Recovery |
|---|---|---|---|
| Feed | 100.0 | 22.8 | 100.0 |
| 1st Froth | 60.2 | 7.4 | 19.5 |
| 2nd Froth | 7.1 | 25.8 | 8.0 |
| 3rd Froth | 2.9 | 34.2 | 4.3 |
| Concentrate | 29.8 | 52.2 | 68.2 |

It will be noted that the grade (percent Fe) of the concentrate thus produced was much lower than in the case of the previous test, namely, 52.2% Fe instead of 60.4% Fe. Thus, the beneficial result from first conditioning the feed with the causticized starch solution in a thick pulp, is again proven.

In still other tests, iron ore pulps containing various percentages of solids were initially conditioned with a solution of gelatinized starch, and it was found preferable to hold the solids in the pulp between 50% and 65%, by weight.

From the foregoing, it will be apparent that the present improved method of concentrating low grade iron ores offers several advantages. Not only is the quantity of starch employed much less critical than in previous methods, but the improved method is capable of giving excellent results, even when the ore pulp is at widely varying temperatures; and the conditioning of the ore pulp with the gelatinized starch solution can be very quickly performed.

What is claimed is:

The method of concentrating finely-divided iron ores in which the gangue is principally quartz, which consists in the following steps, namely, first partially conditioning the ore in a thick aqueous pulp, with an aqueous solution of gelatinized starch; then diluting said partially conditioned thick ore pulp with water to make a thin ore pulp and further conditioning said thin ore pulp with an aqueous solution of lime and with an anionic collecting agent selected from the class consisting of higher fatty acids and resin acids and mixtures of fatty and resin acids and the soaps thereof; and finally subjecting the thus diluted and fully conditioned ore pulp to froth-flotation treatment and removing the quartz-containing froth, thereby producing in the residue of the pulp an iron concentrate.

WILLIAM L. SULLIVAN.

REFERENCES CITED

The following references are of record in the file of this patent:

UNITED STATES PATENTS

| Number | Name | Date |
|---|---|---|
| 2,364,777 | Brown | Dec. 12, 1944 |
| 2,410,377 | Booth | Oct. 29, 1946 |

OTHER REFERENCES

Taggart, Handbook of Mineral Dressing, 1945, section 12, pages 18, 19 and 20.